United States Patent
Anai et al.

(10) Patent No.: US 11,195,635 B2
(45) Date of Patent: Dec. 7, 2021

(54) CONDUCTIVE FILM MANUFACTURING METHOD

(71) Applicant: MITSUI MINING & SMELTING CO., LTD., Tokyo (JP)

(72) Inventors: Kei Anai, Ageo (JP); Shun Fukuzato, Ageo (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 0 days.

(21) Appl. No.: 16/954,268

(22) PCT Filed: Dec. 19, 2018

(86) PCT No.: PCT/JP2018/046717
§ 371 (c)(1),
(2) Date: Jun. 16, 2020

(87) PCT Pub. No.: WO2019/124420
PCT Pub. Date: Jun. 27, 2019

(65) Prior Publication Data
US 2021/0082597 A1   Mar. 18, 2021

(30) Foreign Application Priority Data
Dec. 22, 2017   (JP) .............................. JP2017-246809

(51) Int. Cl.
*H01B 1/20* (2006.01)
*C09D 5/12* (2006.01)
*H01B 1/22* (2006.01)
*C09D 5/24* (2006.01)

(52) U.S. Cl.
CPC ................. *H01B 1/22* (2013.01); *C09D 5/24* (2013.01)

(58) Field of Classification Search
CPC ........ H01B 1/20; B05D 3/007; B05D 3/0254; B05D 3/065; B05D 3/067; B05D 3/12; B05D 5/12
See application file for complete search history.

(56) References Cited

U.S. PATENT DOCUMENTS

| 7,049,176 B2 * | 5/2006 | Oda .................... H01L 21/4857 101/170 |
| 10,015,890 B2 | 7/2018 | Kaizu et al. |
| 2008/0081178 A1 | 4/2008 | Hinotsu et al. |
| 2008/0237547 A1 * | 10/2008 | Yasuda .................... H01B 1/08 252/500 |
| 2009/0140218 A1 * | 6/2009 | Inaba ...................... H01B 1/22 252/519.31 |
| 2010/0247810 A1 * | 9/2010 | Yukinobu ................ H01B 1/08 428/1.4 |
| 2011/0303885 A1 * | 12/2011 | Vanheusden ............ H01B 1/02 252/513 |
| 2018/0027668 A1 | 1/2018 | Kaizu et al. |
| 2019/0035513 A1 * | 1/2019 | Nagai ...................... H01B 5/14 |

FOREIGN PATENT DOCUMENTS

| JP | 2017-066269 A | 4/2017 |
| JP | 2017-069012 A | 4/2017 |
| KR | 10-2016-0078202 A | 7/2016 |
| KR | 10-2017-0101249 A | 9/2017 |
| WO | WO 2016111133 A1 * | 7/2016 |
| WO | 2017/130812 A1 | 8/2017 |

OTHER PUBLICATIONS

International Search Report, dated Mar. 5, 2019, from corresponding PCT application No. PCT/JP2018/046717.

\* cited by examiner

*Primary Examiner* — Mark Kopec
(74) *Attorney, Agent, or Firm* — Nixon & Vanderhye

(57) ABSTRACT

Provided is a method for manufacturing a conductive film, including forming a coating of a composition that contains conductivity-imparting particles and photo-sintering the coating, wherein, prior to the photo-sintering of the coating, the coating is compressed in the thickness direction thereof. It is preferable that the coating be compressed at a temperature at which a binding agent contained in the composition shows a storage modulus of 100 MPa or less. It is also preferable that the coating be compressed so that the compression rate in the thickness direction is from 25% to 80%. It is preferable that, in the photo-sintering step, the light irradiation be performed through irradiation with pulsed light.

4 Claims, No Drawings

CONDUCTIVE FILM MANUFACTURING METHOD

TECHNICAL FIELD

The present invention relates to a method for manufacturing a conductive film.

BACKGROUND ART

As a technology for forming a conductive pattern of a conductive film on a substrate, a method is known, for example, which includes forming a coating of a predetermined pattern on a substrate with use of a conductive ink or a conductive paste that is a composition containing conductive particles, such as metal particles, and a binding agent, and sintering the conductive particles in the coating to thereby form a conductive film. A method in which the coating is fired by heating is commonly used in order to sinter the conductive particles.

The firing temperature depends on the type of conductive particles, but it is said that the firing temperature needs to be high to a certain extent in order to sinter the conductive particles reliably. However, depending on the type of the substrate on which the conductive film is formed, there is a limitation in increasing the firing temperature.

Thus, photo-sintering has been proposed as a method for sintering conductive particles regardless of the type of the substrate. In photo-sintering, the coating is irradiated with light of a predetermined wavelength, and as a result the conductive particles in the coating generate heat and become sintered. Patent Literature 1, for example, discloses a method for manufacturing a conductive film, the method including forming a coating of a paint containing copper powder on a base material made of paper, irradiating the coating with light having a wavelength component within a range of 240 to 600 nm to thereby obtain a sintered conductive film, pressurizing the sintered conductive film together with the base material made of paper in a state in which the sintered conductive film is heated to 90 to 190° C., to thereby reduce the void volume in the sintered conductive film. Patent Literature 2 discloses a method for manufacturing a conductive film on a base material by applying a conductive paste to the base material, performing pre-firing of the coating, and then performing firing of the resulting coating through irradiation with light, wherein the light irradiation is performed with light of a wavelength of 200 to 800 nm at a pulse period of 500 to 2000 μs and a pulse voltage of 1600 to 3800 V, and Patent Literature 2 also discloses that the conductive film formed on the base material is compressed.

CITATION LIST

Patent Literature

Patent Literature 1: JP 2017-66269A
Patent Literature 2: JP 2017-69012A

SUMMARY OF INVENTION

In photo-sintering, it is effective to irradiate the conductive particles with strong light in order to sinter the conductive particles reliably. In that case, however, a phenomenon may occur in which the binding agent contained in the conductive composition is decomposed by light, causing a large amount of gas to be generated instantaneously, and the conductive particles therefore scatter from within the coating before the conductive particles become sintered. This scattering phenomenon inhibits the formation of a good-quality conductive film.

Therefore, an object of the present invention relates to an improvement of a method for manufacturing a conductive film, and more particularly relates to an improvement of a method for manufacturing a conductive film through photo-sintering.

The present invention achieved the above-described object by providing a method for manufacturing a conductive film, comprising: forming a coating of a composition that contains conductivity-imparting particles; and photo-sintering the coating, wherein, prior to the photo-sintering of the coating, the coating is compressed in a thickness direction thereof.

DESCRIPTION OF EMBODIMENTS

Hereinafter, the present invention will be described based on preferred embodiments thereof. In the present invention, a coating of a composition that contains conductivity-imparting particles is formed, and a conductive film is formed by photo-sintering the coating. It is preferable that the composition contain not only the conductivity-imparting particles but also a binding agent and a solvent, for example. The composition is generally used in the form of a paste or an ink that contain these components.

In the present manufacturing method, a coating of a composition that contains conductivity-imparting particles is first formed on a base material. Regarding the method for forming the coating, an appropriate method is employed in accordance with, for example, the characteristics of the composition and the pattern of the coating. Examples of the method for forming the coating include screen printing, photogravure printing, inkjet printing, transfer printing, laser printing, xerography printing, pad printing, spin coating, casting, dip coating, spray coating, and dispensing.

Examples of the base material to which the composition is applied include various synthetic resin films, glass epoxy substrates, phenolic resin substrates, liquid crystal polymers, green sheets, ceramics, glass plates, and paper. Examples of the synthetic resin include polyimide, polyethylene terephthalate, polyethylene naphthalate, and a cycloolefin polymer.

After the coating of the composition has been formed on one face of the base material, the coating is preferably pre-dried. The pre-drying can be performed in the air or in an inert gas atmosphere, for example. The drying conditions depend on the constituent components of the coating and the heat resistance of the base material, but the temperature is generally preferably from 50° C. to 250° C., more preferably from 60° C. to 230° C., and even more preferably from 70° C. to 200° C. The shape retention properties of the coating can be improved by performing pre-drying within this temperature range. Consequently, during the compression step, which is the next step, the coating is not so spread in a width direction and is compressed mainly in a thickness direction, and therefore a good-quality conductive film can be obtained. The pre-drying time is preferably 0.1 to 5.0 hours, and more preferably 0.2 to 3.0 hours, provided that the pre-drying temperature is within the above-described range.

After the pre-drying of the coating has been completed in the above-described manner, the coating is photo-sintered. In the present manufacturing method, however, a step of compressing the coating in its thickness direction is performed prior to photo-sintering the coating. Voids that are present in the coating are reduced by compressing the coating, and the film density increases accordingly. As a result, in the photo-sintering step, which is performed subsequently, excessive movement of the conductivity-imparting particles contained in the coating is suppressed, and therefore the conductivity-imparting particles are effectively prevented from scattering from within the coating. Thus, a good-quality conductive film can be obtained.

In view of even more effectively suppressing scattering of the conductivity-imparting particles from within the coating during the photo-sintering step, the degree to which the coating is compressed is set so that the compression rate in the thickness direction is preferably from 25% to 80%, more preferably from 30% to 70%, and even more preferably from 30% to 60%. The compression rate (%) is calculated from {(coating thickness before compression−coating thickness after compression)/coating thickness before compression}× 100. The coating thickness before compression means the thickness of the coating immediately before the compression, and in a case where the above-described pre-drying is preformed, the coating thickness before compression means the thickness of the coating after the pre-drying and immediately before the compression. The thickness of the coating is measured using, for example, a micrometer or a pair of vernier calipers.

Regarding the means for compressing the coating, an appropriate means is used in accordance with the type of the base material. For example, a reciprocal press, a roll press, or the like can be used. During the compression, the pressure can be adjusted so that the compression rate of the coating is within the above-described range, and the pressure is generally preferably from 5 MPa to 700 MPa, more preferably from 35 MPa to 600 MPa, and even more preferably from 70 MPa to 430 MPa.

Compression of the coating is preferably performed at a temperature at which a binding agent contained in the composition forming the coating shows a storage modulus of 100 MPa or less. When compression of the coating is performed under such temperature conditions, the binding agent flows moderately, and therefore the voids that are present in the coating can be filled more successfully. As a result, in the photo-sintering step, excessive movement of the conductivity-imparting particles contained in the coating is suppressed more securely. Accordingly, not only the conductivity-imparting particles are effectively prevented from scattering from within the coating, but also the sinterability of the conductivity-imparting particles improves. Thus, the resistance of the conductive film to be obtained can be reduced more successfully. From this viewpoint, the storage modulus of the binding agent in the coating during the compression is more preferably 80 MPa or less, and even more preferably 70 MPa or less. Although there is no particular limitation on the lower limit of the storage modulus of the binding agent during the compression of the coating, it is generally preferably 5 MPa or greater, and particularly preferably 10 MPa or greater.

When the binding agent has a storage modulus of 100 MPa or less at room temperature, compression of the coating can be performed at room temperature. When the binding agent shows a storage modulus of greater than 100 MPa at room temperature, compression of the coating is preferably performed in a state in which the temperature is increased to a temperature at which the binding agent shows a storage modulus of 100 MPa or less. The storage modulus of the binding agent can be determined by performing dynamic mechanical analysis (DMA). In the case where the binding agent shows a storage modulus of greater than 100 MPa at room temperature, the temperature at which the binding agent shows a storage modulus of 100 MPa or less can be determined by measuring the storage modulus of the binding agent while increasing the temperature of the binding agent.

After the coating has been compressed, the coating is then subjected to the photo-sintering step. In the photo-sintering step, the coating is irradiated with light of a predetermined wavelength. The light irradiation is preferably irradiation with pulsed light, because this makes it easier to control the temperature. "Pulsed light" refers to light with which the light irradiation period (irradiation time) is short, and for the case where light irradiation is repeated multiple times, "pulsed light" means a mode of light irradiation that has a period of no light irradiation between a first light irradiation period and a second light irradiation period. The intensity of light may change during a single light irradiation period.

The pulse width of the pulsed light is preferably from 5 μs to 1 s, and more preferably from 20 μs to 10 ms. The irradiation with pulsed light may be performed once, or may be repeated multiple times. In the case where the irradiation is repeated multiple times, the interval between irradiations is preferably from 10 μs to 30 s, and more preferably from 20 μs to 10 s.

Regarding the light source for use in the photo-sintering step, a light source is used which emits light of a wavelength that can make the conductivity-imparting particles generate heat through light irradiation. For example, a known light source such as a xenon flash lamp can be used. Xenon light has a spectrum that covers wavelengths from 200 nm to 800 nm. In the case where a xenon flash lamp is used, optimal conditions can be set with the pulse width within a range from 5 μs to 1 s and the pulse voltage within a range from 1600 V to 3800 V.

The conductive film that has been formed through photo-sintering can be subjected to a downstream step, if necessary. An example of the downstream step is compression processing. There are many voids in the conductive film after photo-sintering, the voids forming as a result of volatilization of an organic component, such as a solvent, contained in the coating. If the conductive film is compressed so that the voids are collapsed, the conductivity improves. Moreover, the compression processing of the conductive film has another advantage of improving the adhesion between the conductive film and the base material. A roll press for example can be used to compress the conductive film.

The thus obtained conductive film has low resistance due to the densely sintered conductivity-imparting particles that result from effective prevention of scattering the conductivity-imparting particles in the photo-sintering step. Thus, the conductive film can be used as various electric or electronic circuits. Furthermore, the conductive film can also be used as RFID antennas or the like.

The conductivity-imparting particles contained in the composition used in the present manufacturing method are of a substance capable of imparting conductivity to a conductive film formed of that composition. The conductivity-imparting particles may have conductivity prior to photo-sintering, or may be a substance that can undergo a chemical change and thus acquire conductivity as a result of photo-sintering. Particles made of a metal, for example, are used as the conductivity-imparting particles. Examples of the metal particles include particles of gold, silver, copper, nickel, cobalt, zinc, tin, indium, gallium, aluminum, palladium, tantalum, and niobium, as well as particles of alloys composed of two or more of these metals. Moreover, it is also possible to use particles obtained by forming, on the surface of particles made of any of the aforementioned metals, a coating layer made of another metal. Furthermore, it is also possible to use particles obtained by forming, on the surface of particles made of any of the aforementioned metals, a coating layer made of an oxide of that metal. In addition to these particles, metal oxide particles that have conductivity and metal oxide particles that acquire conductivity as a result of being reduced can also be used as the conductivity-imparting particles. Examples of the metal oxide particles include particles of a silver oxide, a copper oxide, a nickel oxide, a cobalt oxide, a zinc oxide, a tin oxide, and an indium-tin oxide. The above-described particles may be used singly or in a combination of two or more thereof as the conductivity-imparting particles. Of the above-described conductivity-imparting particles, copper particles are favorably used in view of, for example, the availability and the high conductivity thereof.

The conductivity-imparting particles may have a spherical shape, a plate-like shape, or a fiber-like shape, for example. The conductivity-imparting particles may have any one of these shapes, or may be a combination of two or more types of conductivity-imparting particles that have different shapes.

In view of obtaining a dense, low-resistance conductive film, the particle diameter of the conductivity-imparting particles is preferably from 0.01 μm to 20 μm, more preferably from 0.03 μm to 20 μm, and even more preferably from 0.05 μm to 10 μm, in terms of the volume-based cumulative particle diameter $D_{50}$ at a cumulative volume of 50 vol % as determined by laser diffraction scattering particle size distribution analysis. From the same viewpoint, the particle size distribution curve of the conductivity-imparting particles may have a single peak or two or more peaks.

It is preferable that the composition used in the present manufacturing method contain a binding agent in addition to the conductivity-imparting particles. The binding agent is used as a vehicle for dispersing the conductivity-imparting particles. From this viewpoint, it is preferable to use an organic macromolecular compound as the binding agent. Examples of the organic macromolecular compound include polyamide resins; polyester resins such as polyethylene terephthalate; cellulose-based materials such as ethyl cellulose, methyl cellulose, cellulose acetate butyrate, cellulose acetate, cellulose acetate propionate, hydroxypropylmethyl cellulose, hydroxyethylmethyl cellulose, hydroxyethyl cellulose, propyl cellulose, nitrocellulose, and ethylhydroxyethyl cellulose; alkyd resins; various acrylic resins with acrylic main chains composed mainly of acrylic or methacrylic acids or esters of these acids, such as methacrylic ester polymers, acrylic ester polymers, acrylic ester-methacrylic ester copolymers, and butyl methacrylate resins; vinyl resins such as polyvinyl alcohol, polyvinyl butyral, and α-methylstyrene polymers; petroleum resins such as terpene resins and terpene phenolic resins, aromatic petroleum resins, hydrogenated petroleum resins, and cyclopentadiene petroleum resins, polybutadiene resins; polyisoprene resins; polyether resins; and ethylene oxide polymers. These binding agents may be used singly or in a combination of two or more.

The binding agent is added in an amount of preferably 0.1 parts to 20 parts by mass, more preferably 0.5 parts to 15 parts by mass, and even more preferably 1 parts to 10 parts by mass with respect to 100 parts by mass of the conductivity-imparting particles. When the binding agent is added in an amount within the above-described range, the formation of a coating and the formation of a conductive film can be performed successfully.

The binding agent when use is usually dissolved in an organic solvent. For example, ethyl carbitol acetate, terpineol, ethylbenzene, α-terpinene, myrcene, dihydroterpinyl acetate alone or with dihydroterpineol, butyl carbitol acetate, butyl carbitol, pentanediol, limonene, isobornylphenol, isobornyl cyclohexanol, and the like can be used as the organic solvent. These organic solvents may be used singly or in a combination of two or more.

The organic solvent is added in an amount of preferably 1 parts to 50 parts by mass inclusive, more preferably 3 parts to 45 parts by mass inclusive, and even more preferably 5 parts to 40 parts by mass inclusive with respect to 100 parts by mass of the conductivity-imparting particles. When the organic solvent is added in an amount within the above-described range, the formation of a coating and the formation of a conductive film can be performed successfully.

In addition to the binding agent and the organic solvent described above, other components may also be added to the composition that contains conductivity-imparting particles, if necessary. Examples of such components include a photopolymerization initiator, an ultraviolet absorber, a sensitizer, a sensitization aid, a polymerization inhibitor, a plasticizer, a thickening agent, an organic solvent, an antioxidant, a dispersing agent, an antifoaming agent, and an organic or inorganic anti-precipitation agent.

EXAMPLES

Hereinafter, the present invention will be described in greater detail by way of examples. However, the scope of the present invention is not limited to the following examples. Unless otherwise specified, "%" means "mass %", and "parts" means "parts by mass".

Example 1

Plate-shaped copper particles ($D_{50}$=3 µm), in an amount of 90 parts, and spherical copper particles ($D_{50}$=0.2 µm), in an amount of 10 parts, were used as conductivity-imparting particles. A polyamide resin (TPAE-826-5A manufactured by T&K TOKA Co., Ltd. and showing a storage modulus of 58 MPa at 25° C.) was used as a binding agent in an amount of 4 parts. Terpineol, in an amount of 17.5 parts, and limonene, in an amount of 7.5 parts, were used as organic solvents. These components were kneaded using a three-roll kneader to obtain a paste.

The obtained paste was applied to one face of a polyethylene terephthalate film having a thickness of 100 µm through screen printing to form a coating having a thickness of 50 µm. The coating had a size of 1 cm square. This coating was pre-dried for 30 minutes at 110° C. in the air, and then the coating was cooled to 25° C. The coating after cooling had a thickness of 47 µm. Next, the coating was protected by placing a release film on a surface of the coating, followed by compression at the same temperature and a pressure of 143 MPa in the air. The compression was performed using a hydraulic press. The coating after compression had a thickness of 32.9 µm. Accordingly, the compression rate was 30%. Subsequently, the coating was subjected to the photo-sintering step. The photo-sintering was performed using a xenon flash lamp. The pulse width was set to be 2 ms, and the pulse voltage was set to be 2500 to 3000 V. A release film was placed on a surface of the thus obtained conductive film to protect the conductive film, followed by compression at a pressure of 215 MPa using a hydraulic press. The conductive film had a thickness of 30 µm.

Example 2

A conductive film was obtained in the same manner as in Example 1 except that the pressure for compressing the coating was 215 MPa. The compression rate of the coating was 40%.

Example 3

A conductive film was obtained in the same manner as in Example 1 except that paper with a basis weight of 83 g/m² was used as the base material. The compression rate of the coating was 30%.

Example 4

A conductive film was obtained in the same manner as in Example 1 except that ethyl cellulose (ETHOCEL STD100 manufactured by Nisshin & Co., Ltd. and having a storage modulus of 1000 MPa at 25° C.) was used instead of the binding agent used in Example 1. The compression rate of the coating was 30%.

Comparative Example 1

A conductive film was obtained in the same manner as in Example 1 except that the coating was subjected to the photo-sintering step without performing the compression of the coating.

Comparative Example 2

A conductive film was obtained in the same manner as in Example 4 except that the coating was subjected to the photo-sintering step without performing the compression of the coating.

Evaluation

The state of the conductive films obtained in the examples and the comparative examples was visually observed and evaluated using the following criteria. Table 1 below shows the results.

Good: Uniform surface with no scattering of copper particles observed
Fair: Partially rough surface due to scattering of copper particles
Poor: Entirely rough surface due to scattering of copper particles

TABLE 1

| | Base material | Binding agent | Compression of coating | Storage modulus of resin during compression of coating (MPa) | Compression rate (%) | State of conductive film |
|---|---|---|---|---|---|---|
| Ex. 1 | PET | Polyamide | yes | 58 | 30 | Good |
| Ex. 2 | PET | Polyamide | yes | 58 | 40 | Good |
| Ex. 3 | Paper | Polyamide | yes | 58 | 30 | Good |
| Ex. 4 | PET | Ethyl cellulose | yes | 1000 | 30 | Fair |
| Com. Ex. 1 | PET | Polyamide | no | — | — | Poor |
| Com. Ex. 2 | PET | Ethyl cellulose | no | — | — | Poor |

As is clear from the results shown in Table 1, the conductive films obtained in the examples had a uniform surface with no scattering of the copper particles observed, whereas the conductive films obtained in Comparative Examples 1 and 2 had a rough surface due to scattering of the copper particles.

INDUSTRIAL APPLICABILITY

According to the manufacturing method of the present invention, scattering of particles during photo-sintering is suppressed, and a good-quality conductive film can thus be easily obtained.

The invention claimed is:

1. A method for manufacturing a conductive film, comprising:
   forming a coating of a composition that contains conductivity-imparting particles and a binding agent; and
   photo-sintering the coating,
   wherein, prior to the photo-sintering of the coating, the coating is compressed in a thickness direction thereof, and
   wherein the coating is compressed at a temperature at which the binding agent contained in the composition shows a storage modulus of 100 MPa or less.

2. The method according to claim 1,
   wherein the binding agent is a polyamide resin or a cellulose-based material.

3. The method according to claim 2,
   wherein the coating is compressed so that a compression rate in the thickness direction is from 25% to 80%.

4. The method according to claim 1,
   wherein the coating is compressed so that a compression rate in the thickness direction is from 25% to 80%.

* * * * *